United States Patent
Rao et al.

(10) Patent No.: US 9,213,995 B1
(45) Date of Patent: Dec. 15, 2015

(54) SYSTEM AND METHOD FOR LINKING NETWORKS TO ONE ANOTHER AND SHARING RESOURCES BETWEEN MEMBERS

(76) Inventors: Pratima Rao, Plano, TX (US); Priyanka Rao, Plano, TX (US); Naina Rao, Plano, TX (US)

(*) Notice: Subject to any disclaimer, the term of this patent is extended or adjusted under 35 U.S.C. 154(b) by 1284 days.

(21) Appl. No.: 12/883,003

(22) Filed: Sep. 15, 2010

Related U.S. Application Data

(60) Provisional application No. 61/242,793, filed on Sep. 15, 2009.

(51) Int. Cl.
 G06F 15/16 (2006.01)
 G06Q 50/00 (2012.01)
 H04L 29/06 (2006.01)
 H04W 48/16 (2009.01)

(52) U.S. Cl.
 CPC ............. G06Q 50/01 (2013.01); H04L 63/101 (2013.01); H04W 48/16 (2013.01)

(58) Field of Classification Search
 CPC ... G06F 17/3089; H04L 51/32; H04L 12/588; H04L 63/101; H04L 12/2856; H04L 12/2859; H04L 65/4007; H04L 67/1095; H04L 67/2814; H04L 12/2818; G06Q 50/01
 USPC ............... 709/220, 227, 228, 203–204; 707/3
 See application file for complete search history.

(56) References Cited

U.S. PATENT DOCUMENTS

| | | | |
|---|---|---|---|
| 6,621,823 B1* | 9/2003 | Mellquist et al. | 370/401 |
| 7,761,591 B2* | 7/2010 | Graham | 709/233 |
| 8,316,438 B1* | 11/2012 | Bush et al. | 726/22 |
| 2002/0111942 A1* | 8/2002 | Campbell et al. | 707/3 |
| 2003/0217139 A1* | 11/2003 | Burbeck et al. | 709/224 |
| 2004/0210767 A1* | 10/2004 | Sinclair et al. | 713/201 |
| 2006/0242238 A1* | 10/2006 | Issa | 709/204 |
| 2007/0118803 A1* | 5/2007 | Walker et al. | 715/744 |
| 2008/0228746 A1* | 9/2008 | Markus et al. | 707/5 |
| 2008/0267091 A1* | 10/2008 | Parkkinen et al. | 370/255 |
| 2009/0100169 A1* | 4/2009 | Allen et al. | 709/224 |
| 2009/0222517 A1* | 9/2009 | Kalofonos et al. | 709/204 |
| 2009/0298426 A1* | 12/2009 | Helvick | 455/41.1 |

* cited by examiner

*Primary Examiner* — Wing F Chan
*Assistant Examiner* — Benjamin M. Thieu
(74) *Attorney, Agent, or Firm* — Howison & Arnott, LLP

(57) ABSTRACT

An embodiment of a method of linking a first network to a second network includes sending, by a first network having at least one first member associated therewith, a link request message to a second network having at least one second member associated therewith. The link request message includes a request to establish a link with the second network. The first network further includes at least one resource associated therewith and accessible by the at least one first member. The method further includes receiving an acceptance message from the second network at the first network, establishing a first link between the first network and the second network in response to receiving the acceptance message, and sharing access to the at least one resource to the at least one second member of the second network.

20 Claims, 15 Drawing Sheets

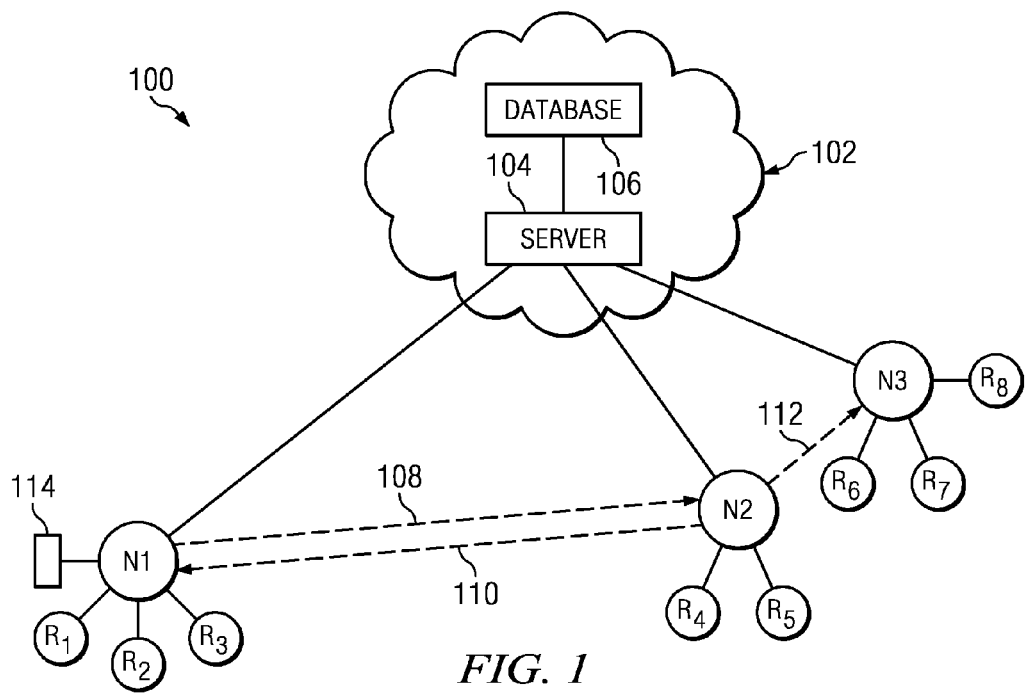
FIG. 1
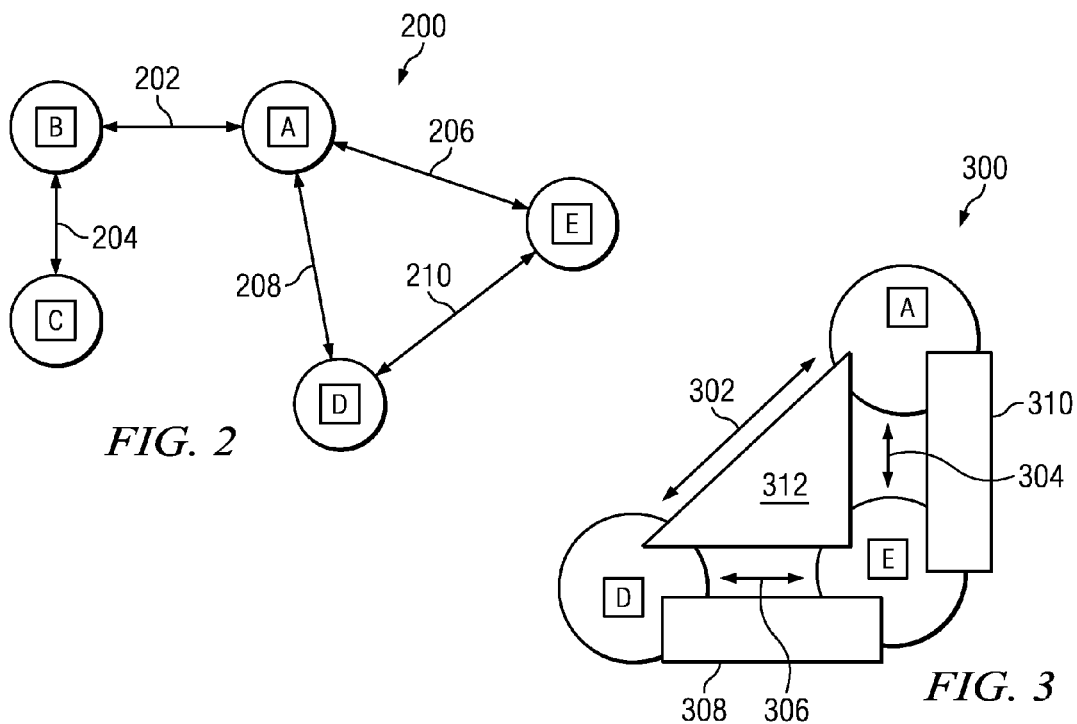
FIG. 2
FIG. 3

SYSTEM AND METHOD FOR LINKING NETWORKS TO ONE ANOTHER AND SHARING RESOURCES BETWEEN MEMBERS

CROSS-REFERENCE TO RELATED APPLICATIONS

This application claims benefit of U.S. Provisional Application Ser. No. 61/242,793, filed on Sep. 15, 2009, and entitled SOFTWARE APPLICATION FOR DIRECTLY CONNECTING ORGANIZATIONAL DATABASES TO ONE ANOTHER VIA THE INTERNET.

TECHNICAL FIELD

Embodiments of the invention are directed to linking, through the use of computers and communications devices and the like, networks of users, and related methods, systems, and software applications.

BACKGROUND

Existing social networking applications currently available over the internet are primarily concerned with connecting individual members of a network to one another. This is achieved by one individual sending an electronic request to connect to another individual and the other individual accepting the electronic request. Examples of websites that offer this type of service include LinkedIn, Facebook, Plaxo and Twitter. Such software applications are geared toward connecting individuals and do not provide functionality designed for organizational entities to connect to one another.

SUMMARY

An embodiment of a method of linking a first network to a second network includes sending, by a first network having at least one first member associated therewith, a link request message to a second network having at least one second member associated therewith. The link request message includes a request to establish a link with the second network. The first network further includes at least one resource associated therewith and accessible by the at least one first member. The method further includes receiving an acceptance message from the second network at the first network, establishing a first link between the first network and the second network in response to receiving the acceptance message, and sharing access to the at least one resource to the at least one second member of the second network.

A system for linking a first network to a second network includes a first network, a second network, and a server. The first network has at least one first member associated therewith. The first network further includes at least one resource associated therewith and accessible by the at least one first member. The second network has at least one second member associated therewith. The server is in communication with the first network and the second network. The server is configured to receive a link request message from the first network, the link request message including a request to establish a link between the first network and the second network. The server is further configured to send the link request message to the second network, receive an acceptance message from the second network, send the acceptance message to the first network, establish a first link between the first network and the second network in response to receiving the acceptance message, and share access to the at least one resource to the at least one second member of the second network.

BRIEF DESCRIPTION OF THE DRAWINGS

For a more complete understanding, reference is now made to the following description taken in conjunction with the accompanying Drawings in which:

FIG. 1 illustrates an embodiment of a system for linking networks to facilitate the sharing of resources between members;

FIG. 2 illustrates an embodiment of an example linking structure and resource sharing among members of five networks;

FIG. 3 illustrates another embodiment of an example linking structure and resource sharing between three networks;

DETAILED DESCRIPTION

Figure 4:
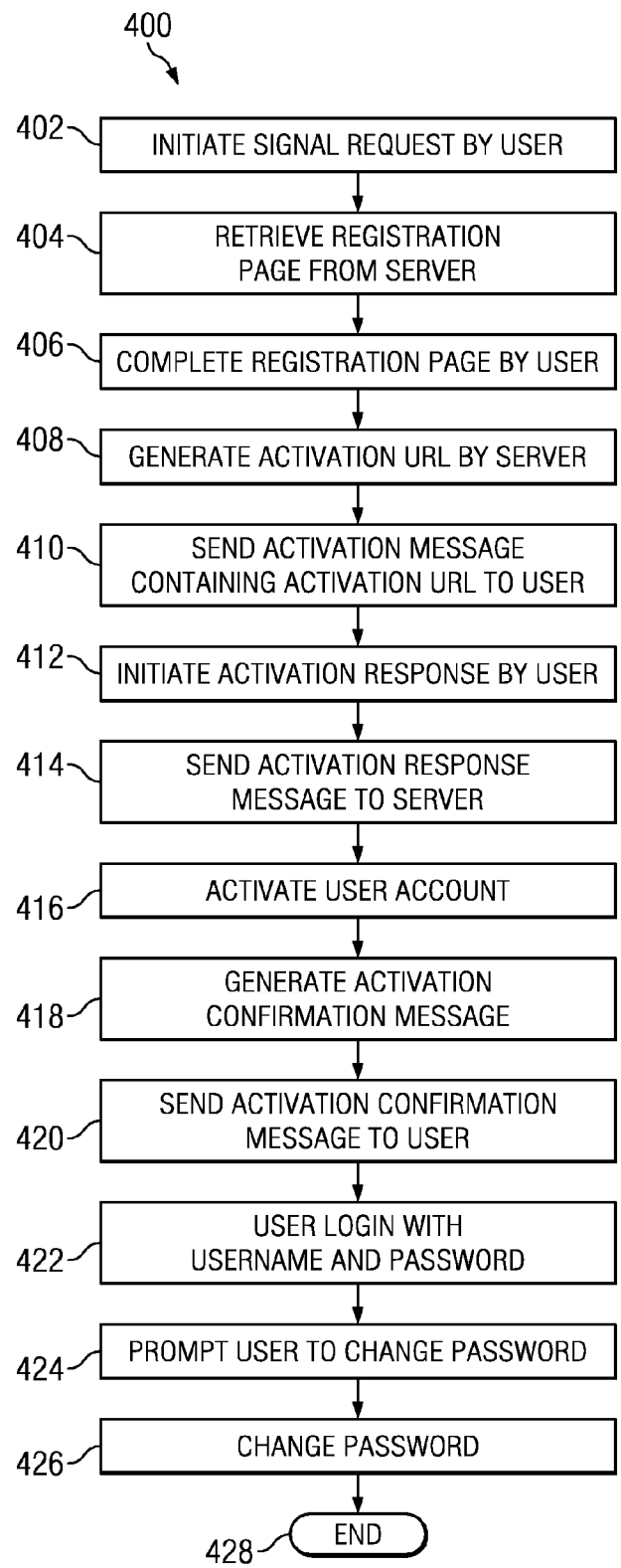
FIG. 4 illustrates an embodiment of a procedure for sign up of a user on a central network.

Referring now to the drawings, wherein like reference numbers are used herein to designate like elements throughout, the various views and embodiments of a system and method for linking networks to one another and sharing resources between members are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Various embodiments of the invention provide a system and method for linking together of two or more networks, and facilitating the sharing of resources associated with individual networks to network members of other networks. A network may refer to any organizational entity either formal or informal including corporations, businesses, employee resource groups, non-profit organizations, associations, alumni groups, social groups, chambers of commerce, trade associations, sport associations, sister organizations, faith based organizations, independent units of the same organization, chapters, affinity networks, professional organizations, and other associations. Each network may include network members which may include individuals, corporations, for profit or non profit organizations, businesses, associations, employees or other individuals with a common interest. Various embodiments provide a platform that allows networks to connect with one another by one network sending a request to connect to the other network and the other network accepting. When the two networks are connected, and when the networks allow for it in connection preferences, members of each of the individual networks will be connected to one another without requiring each member of the networks to send individual connection requests to other members. For example, if each network between two networks has a hundred members, the equivalent of ten thousand individual connections may be established with just one link. Each individual network may choose whether to make itself available for linking with other networks, and the network can choose whether to accept a request to link to another network.

Each network may include a number of resources associated therewith. These resources may include, for example, membership lists, event calendars, blogs, forums and forum topics, announcements, newsletters, chat sessions, groups, group events, bulletins, discussions and discussion topics, documents, video, pictures, broadcast media, slides, databases, and document storage space. Each network may choose to share one or more of these resources with members of another network to which it is linked. Each network may further have an organizational database associated therewith.

Various embodiments of the invention provide a platform and process to link one network to another for the performance of various functions, such as, sharing of information, privileges, and processes, based on selected criteria, for example, a common interest, purpose, need, race, color, religion, age, gender, disability, military status, sex, pregnancy, language, nation of origin. Various embodiments provide for methods, systems, and software that enable users to customize their links according to selectable criteria. In various embodiments, a network can choose whether to make itself available for linking with other networks. If available, the network can choose whether to accept a request to link to another network. Various embodiments described herein may be implemented by any suitable hardware or software such as, for example, using Java, PHP, .Net, or any other suitable technology that may evolve over time.

In some embodiments, network groups may be created in one or more networks. A group may include one or more selected members of a particular network, or selected members of more than one network grouped together for a common purpose, goal or interest. The groups may be formed across linked networks based on one or more selectable criteria such as, for example, a common interest, purpose, need, race, religion, age, gender, disability, military status, sex, pregnancy, language, nation of origin, or rules-based tags. A rules-based tag may be an identifier that gives a semantic meaning to information or characteristics associated with a member. Accordingly, an access rule may be established that takes into account one or more tags and limits resources to those members having the tagged characteristic. For example, a CEO may tag a particular resource and share it only with other CEOs. Members of a group may belong to one or more networks on a common network and share selected resources with one another. In some embodiments, a group may exist within a network that includes only members from the network. In some embodiment, a user may be a member of only one network. In still other embodiments, a user may be a member of two or more networks. In various embodiments, one or more resources may be owned by a member, and this member may share the one or more resources with other members, groups, or other networks within a central network. In some embodiments, a group itself may be specified as a resource that may be shared with members of a network, with other groups, or with members of other networks.

In various embodiments, networks have fine-grained control over the ability of other networks to find, connect with and get access to their resources. The control available to a network may include whether the network is visible to others in the network, whether other networks can send the network a request to connect, and whether the resources of the network can be accessed by other networks to which the network chooses to connect. In some embodiments, the members of a network can choose whether individual items of their personal profile information will be visible to members of networks that connect to network that they belong to. In some embodiments, When two networks link to one another the connection can have its own set of resources such as blogs, forums, events, newsletters, etc. These resources may not belong exclusively to either network but to the linked entity and therefore available to members of both networks.

FIG. 1 illustrates an embodiment of a system 100 for linking networks to facilitate the sharing of resources between members. The system 100 includes a central network 102 having a server 104 and database 106. In various embodiments, the server 104 may include hardware, software and/or computer instructions to execute various processes and provide various capabilities of the network linking platform described herein. In a particular embodiment, the server 104 is in communication with a database 106 which may store information related to the various aspects of the linking and sharing of resources between linked networks as well as user profiles of the members of the various linked networks. Although the embodiment illustrated in FIG. 1 shows a single server 104 and database 106, it should be understood that in various embodiments, a number of servers and databases may be utilized to form a central network 102. In still other embodiments, instead of using a central network 102 to perform the various functions described herein, a distributed network may be used instead. The server 104 is in communication with a first network N1, a second network N2, and a third network N3 via one or more communication links. The communication links may include any suitable networking connection technology such as the internet. The first network N1 includes resources R1, R2 and R3 associated therewith. The first network N1 further includes first network members that are members of the network N1. The second network N2 includes second network members, and has resources R4 and R5 associated therewith. The third network N3 has third network members and has resources R6, R7 and R8 associated therewith. The resources R1-R8 may include any type of information resource available to members of their respective networks. Examples of information resources include network membership directories, event calendars, blogs, discussion forums, announcements, newsletters, email messages, bulletins, documents, video, audio, images, broadcast media, slides, and document storage areas.

In the embodiment illustrated in FIG. 1, a first link 108 is established between the first network N1 and the second network N2. This link allows selected resources such as resources R1, R2 and R3 associated with the first network N1 to be shared with members of the second network N2. In a particular embodiments, the first link 108 is established by an administrator of the first network N1 sending a link request message to an administrator of the second network N2, and the administrator of the second network N2 accepting this request. In addition, a second link 110 may be established between the second network N2 and the first network N1. The second link 110 allows sharing of resources associated with network N2 such as R4 and R5 to members of the first network N1. A third link 112 is established between the second network N2 and the third network N3 allowing sharing of resources associated with the second network N2 with members of network N3. In the embodiment illustrated in FIG. 1, there is no link established in the return direction between the third network N3 and the second network N2, and therefore resources associated with the third network N3 such as resource R6, R7 and R8 are not shared with members of second network N2. In addition, since there are no links between the first network N1 and the third network N3, no resources are shared therebetween.

The system 100 may further include a communication device 114 associated with a user that is a member of the first network N1. In various embodiments, the communication device 114 may include a computer, a mobile device, a terminal, or any other communication device. A user may use the communication device 114 to access resources associated with the first network N1 and the second network N2 to which he has been authorized. Although for illustration purposes, the communication device 114 is shown in communication with the first network N1, it should be understood that the user may use the communication device 114 to access network resources by logging into the server 104 via any network connection such as the internet. In addition, although for illustration purposes, the first network N1, second network N2 and third network N3 are shown as being external to the central network 102, it should be understood that in various embodiments, the first network N1, the second network N2 and the third network N3 may be logical networks that are stored and maintained in the central network 102.

FIG. 2 illustrates an embodiment of an example linking structure 200 and resource sharing among members of five networks. In the embodiment illustrated in FIG. 2, a network A and a network B are linked together via a link 202 to share each others member directories. This allows their members to network online such as by emailing or communicating in any other way using applications provided by the central network 102. Additional features may be provided such as, for example, allowing members of linked networks to access particular forums or message boards, instant messaging functions and the like. Network B and network C are linked together by link 204 so that their respective members may view the blogs and announcements of each others respective networks and not share any other resources between the networks. Network A and network E are linked together by link 206, network A and network D are linked together by link 208, and network D and network E are linked together by link 210. Network A, network D and network E are all linked together thereby allowing the formation of a cross-network group which may have members of network A, network D, and network E as members of the group. The members of network A, network D, and network E within the group may then share resource of the newly formed group.

FIG. 3 illustrates another embodiment of an example linking structure 300 and resource sharing between three networks. Network A and network D are linked together by link 302, network A and network E are linked together by link 304, and network D and network E are linked together by link 306. In the embodiment illustrated in FIG. 3, network A, network D and network E have all agreed to share selected resources and to allow members of the networks thus linked to form groups. Accordingly, a group 308 may be formed between members of network D and network E having a common interest or characteristic. In at least one embodiment, an administrator may then invite selected members of network A, network D, and network E to join the group. In a particular embodiment, an administrator may create a group and inform other existing networks that the group is available for membership requests. Similarly, a group 310 may be formed between members of network A and network E and a group 312 may be formed between members of network A, network D and network E. Each of the groups 308, 310 and 312 may be comprised of members of the various networks based on one or more factors selected by a group administrator to form the common nexus for each group. For example, one group may be formed only of members who are CEOs of their respective organizations. Another group may be formed of members whose children attend the same school. Another group could be formed of members that are on the same membership committee, board of directors, contractor group, or consultant group.

FIG. 4 illustrates an embodiment of a procedure 400 for sign up of a user on the central network 102. In step 402, a user who wishes to sign on the central network 102 initiates a sign up request. In a particular embodiment, the user initiates the sign up request by accessing the server 104 using a communication device such as a personal computer or mobile communication device. In a particular embodiment, the user accesses a website associated with the server 104 using a browser application. In step 404, a registration page is received from the server 104 and presented to the user. In step 406, the user completes the registration page received from the server and the registration page is sent back to the server 104. Completion of the registration page by the user may include providing one or more information fields such as the full name of the user, a username, an email address, an address, a phone number or any other requested information. Upon completion of the registration page by the user, the server 104 generates an activation Universal Resource Locator (URL). In step 410, the server 104 sends an activation message containing the activation URL to the user. In a particular embodiment, the activation message is an email message which is sent to the email address associated with the user that the user provided during the registration process. In some embodiments, the email may further include the username associated with the user and a temporary password assigned to the user and any other information that is deemed relevant. In still other embodiments, the activation message may be a text message.

In step 412, the user initiates an activation response by activating the activations URL in the activation message. In a particular embodiment, the initiation of the activation response includes the user clicking the URL contained within the email message. In step 414, an activation response message is sent to the server 104. In step 416, the user account associated with the user is activated in response to receiving the activation response message. In one embodiment, the activation URL may be verified by the server 104 to ensure that the activation response message originated from the user. In step 418, the server 104 generates an activation confirmation message, and in step 420, the server 104 sends the activation confirmation message to the user. In a particular embodiment, the activation confirmation message is an email addressed to the user's email address. In a particular embodiment, the activation confirmation message may include a user name and password associated with the user. In step 422, the user logs in to the server 104 using the user name and password. At step 424, the user is prompted to change the temporary password provided in the activation confirmation message. In step 426, the user changes the temporary password to the user's desired password. In step 428, the procedure 400 ends. Upon sign up of the user on the central network 102, the user may subsequently request membership in one or more networks associated with the central network 102.

Figure 5:
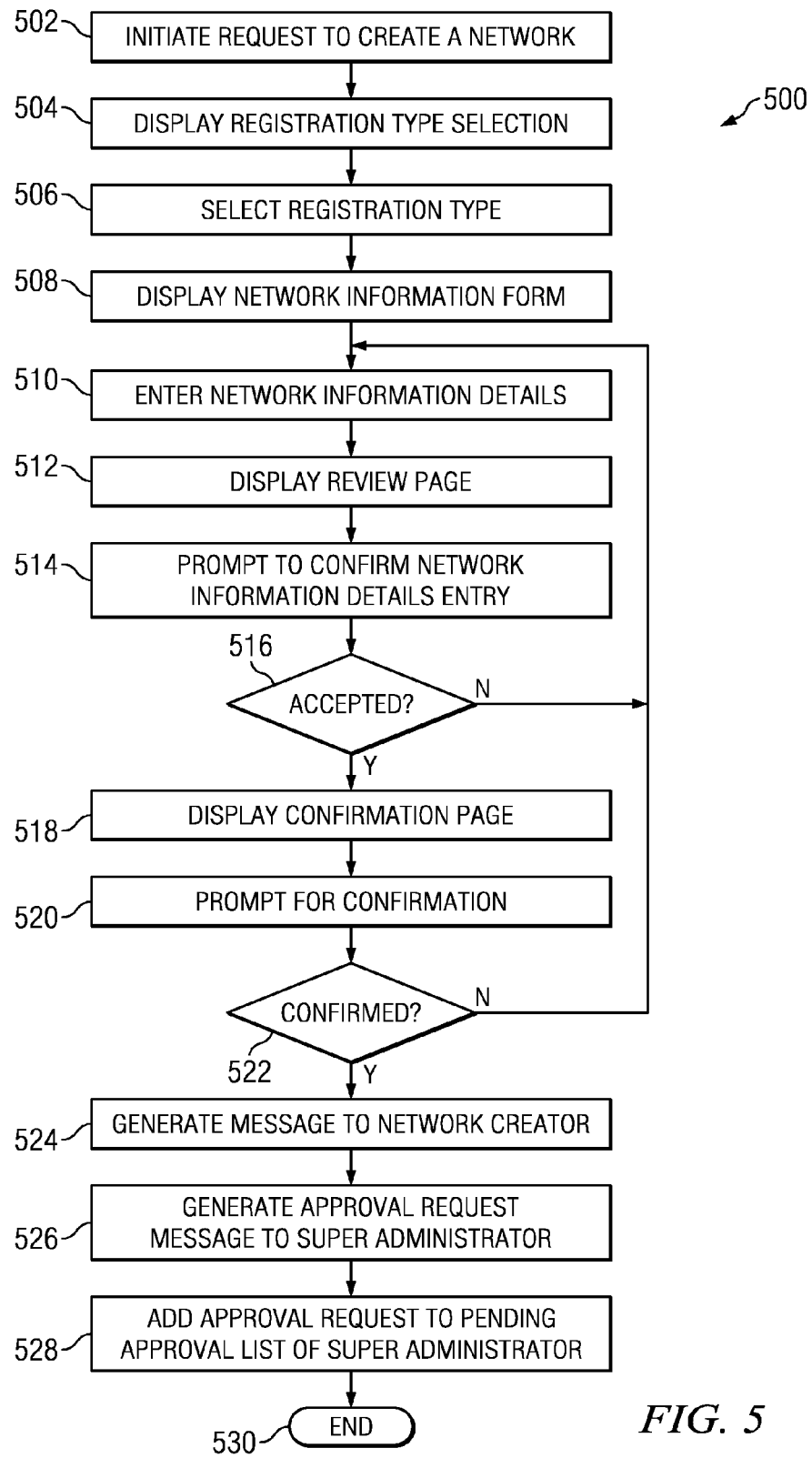
FIG. 5 illustrates an embodiment of a procedure for creating a network within the central network.

FIG. 5 illustrates an embodiment of a procedure 500 for creating a network within the central network 102. In step 502, a registered user of the central network 102 initiates a request to create a network. In a particular embodiment, initiation of the request to create a network includes the user logging in to the server 104, receiving a member profile page associated with the user, and selecting a menu item corresponding to the creation of a network from the member profile page. In step 504, a registration type selection is displayed to the user. The registration type indicates the type of network that is desired to created by the user. Each registration type may include different resources and other features that may be associated with the particular registration type. For example, a basic registration type may be limited to maintaining a membership list or directory and the posting of upcoming events on a network home page. Some other registration types may include support for maintaining blogs, groups, forums, newsletters, announcements, email, linking of networks, payment gateways, yellow pages and online networking Different registration types may also have varying costs associated therewith. For example, a registration type that is free may include only basic capabilities and may include ads in the network pages. Various embodiments may also include different payment plans that are created to include or exclude certain features in a created network. In step 506, the registration type is selected by the user.

In step 508, a network information form is displayed to the user. In step 510, the user enters network information details into the network information form. The network information details may include a network name, a short name for the network, a registration type, a description of the network, a logo for the network, a URL, an address, zip code, city, state, country, ethnicity, language, phone number, a directory type, and network administrator details. In a particular embodiment, an administrator may remove or add additional information fields or any other information that is deemed relevant that is to be received from the user, and these additional fields that may be designated as either mandatory or optional for filing out. The network type may include whether the network is a corporation, business/professional, social/cultural, faith-based, or other type of network. The directory type may include whether the network is a business or personal directory of members. The network administrator details may include the first name, last name, email address and title of the administrator of the particular network. In at least one embodiment, the network administrator is by default the user that creates the network. In step 512, a review page is displayed to the user that allows the user to review all of the network information details that the user has entered. In step 514, the user is prompted to confirm the network information details entry. In step 516, if the user does not accept the network information details entry, the procedure returns to step 510. If the entries are accepted in step 516, the procedure 500 continues to step 518 in which another confirmation page is displayed. At step 520, the user is prompted for confirmation once again. In step 522, if the user does not confirm, the procedure 500 returns to step 510. In step 522, if the user does confirm, the procedure 500 continues to step 524.

In step 524, a message to the network creator is generated indicating that the requested network is pending for approval. In this particular embodiment, the network creator is the user initiating the request. In a particular embodiment, the message is an email addressed to the user. In step 526, an approval request message is generated which is addressed to a super administrator of the central network 102. In step 528, the approval request is added to a pending approval list associated with the super administrator for subsequent approval, which will be described with respect to FIG. 6. In step 530, the procedure 500 ends. In still other embodiments, the requested network may be automatically approved without requiring action by a super administrator.

Figure 6:
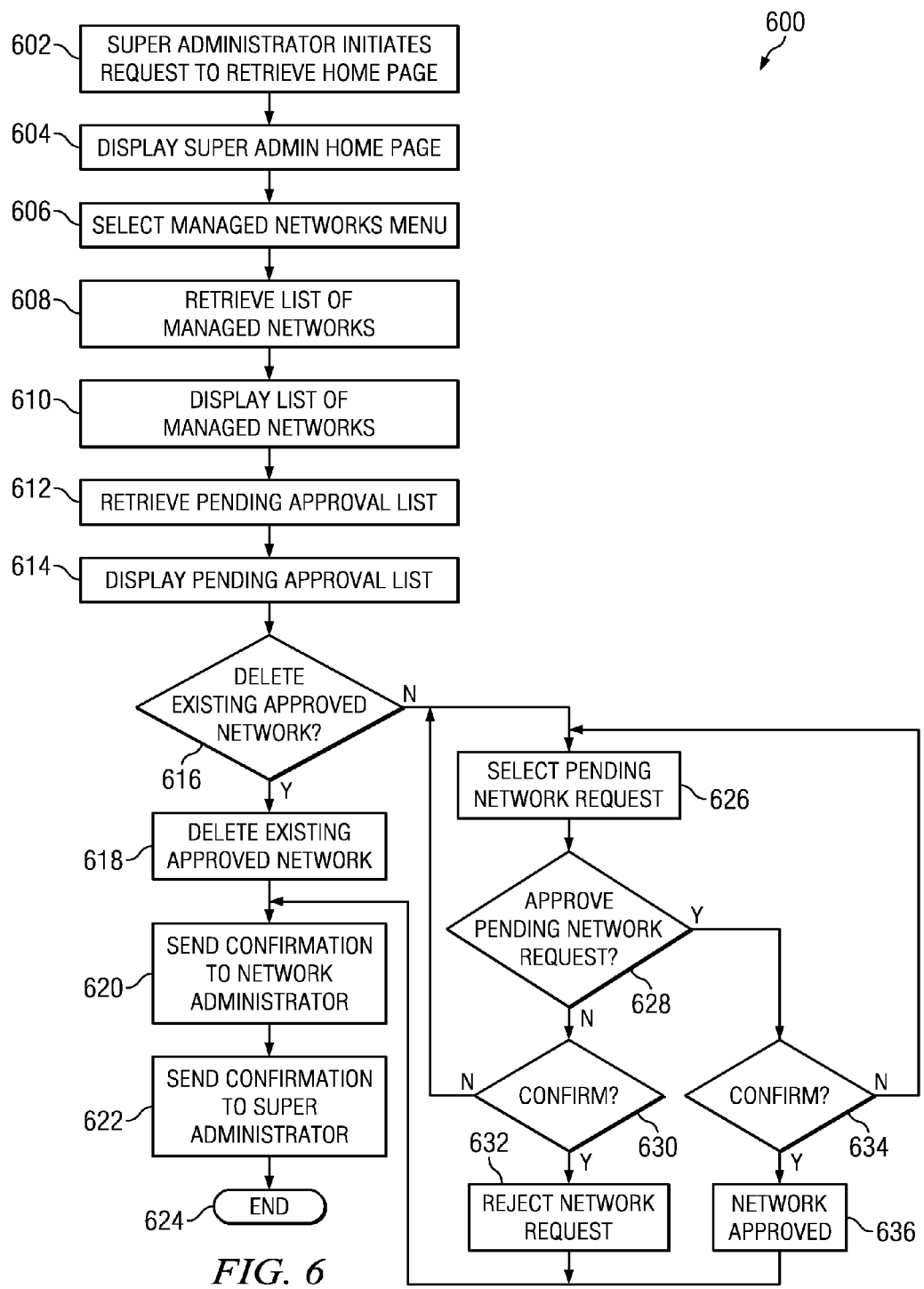
FIG. 6 illustrates an embodiment of a procedure for approving creation of a network within the central network by a super administrator of the central network.

FIG. 6 illustrates an embodiment of a procedure 600 for approving creation of a network within the central network 102 by a super administrator of the central network 102. In step 602, the super administrator initiates a request to retrieve a homepage of the super administrator from the server 104. In a particular embodiment, the retrieval is performed by the super administrator logging in to the server 104. In step 604, the super administrator's homepage is displayed. In step 606, the super administrator selects a managed network menu from the homepage. In step 608, a list of managed networks associated with the super administrator is retrieved from the server 104, and in step 610, the list of managed networks is displayed to the user. In step 612, the pending approval list is retrieved from the server 104, and in step 614, the pending approval list is displayed to the super administrator. In step 616, the super administrator may be provided with the option of deleting an existing approved network displayed in the list of managed networks if the super administrator no longer wishes for the existing approved network to exist. If the super administrator chooses to delete an existing approved network, the existing network that was selected for deletion by the super administrator is deleted in step 618. In step 620, a confirmation message indicating that the existing approved network has been deleted is sent to the network administrator of the deleted network. In step 622, a confirmation that the existing network has been deleted is sent to the super administrator, and in step 624, the procedure 600 ends.

If in step 616, the super administrator chooses not to delete an existing approved network, the procedure continues to step 626. In step 626, the super administrator selects a pending network request from the approval list. In step 628, the super administrator may choose to approve the pending network request if the super administrator wishes to allow creation of the network. If the super administrator does not approve the pending network request, the super administrator is prompted to confirm such disapproval in step 630. If the super administrator does not confirm in step 630, the procedure returns to step 626. If the super administrator confirms the rejection of the pending network request in step 630, the pending network request is rejected in step 632 and the procedure continues to step 620 in which confirmation of the rejection is sent to the network administrator. In step 622, confirmation of the rejection is sent to the super administrator, and in step 624, the procedure 600 ends.

If in step 628 the super administrator approves the pending network request, the super administrator is prompted to confirm in step 634. If the super administrator does not confirm the procedure 600 returns to step 626. If the super administrator does confirm in step 634, the procedure 600 continues to step 636 in which the network is approved and the pending network is created. The procedure 600 continues to step 620 in which confirmation of approval is sent to the network administrator. In step 622, confirmation of approval is sent to the super administrator, and in step 624, the procedure ends. In still other embodiments, the requested network may be automatically created without requiring approval by a super administrator.

Figure 7:
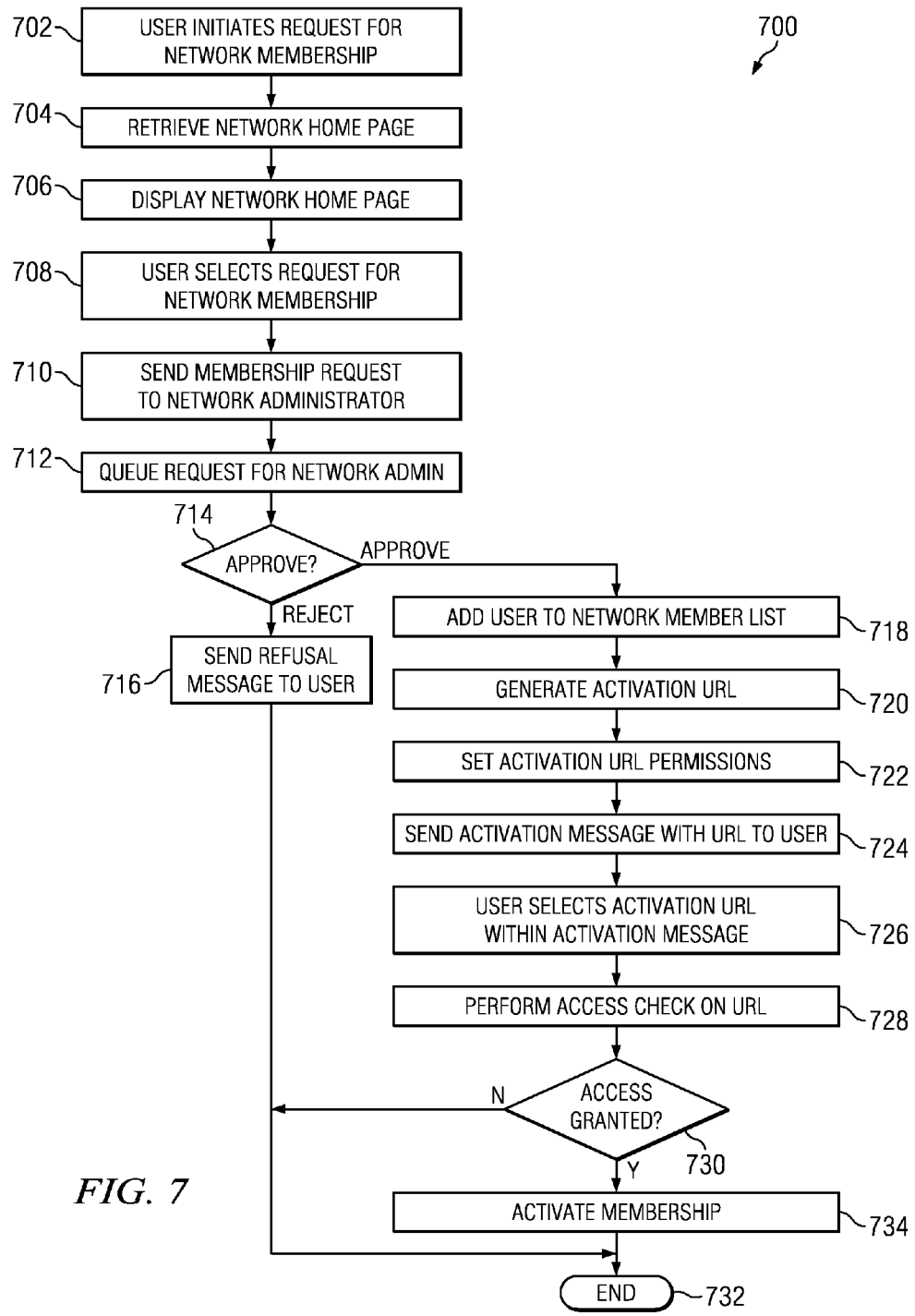
FIG. 7 illustrates an embodiment of a procedure for requesting network membership by a user.

FIG. 7 illustrates an embodiment of a procedure 700 for requesting network membership by a user. In step 702, the user initiates a request for network membership by logging in to the server 104. In step 704, the network homepage is retrieved, and in step 706, the network homepage is displayed to the user including a list of networks to which the user may request membership. In step 708, the user selects a request for network membership in a particular network, and in step 710, the membership request is sent to the network administrator associated with the network. In step 712, the membership request is queued for later approval or rejection by the network administrator. In step 714, the network administrator may choose to either approve or reject the request for network membership by the user. If the network administrator rejects the request, a refusal message is sent to the user in step 716. In a particular embodiment, the refusal message may be an email addressed to the user. In step 732, the procedure ends.

If in step 714, the network administrator approves the request for network membership from the user, the user is added to the network's member list. In step 720, an activation URL is generated. In step 722, permissions that are desired to be given to the user are created and associated with the activation URL. Permissions include network resources to which the new user will be given access. In step 724, an activation message with the URL contained therein is sent to the user. In a particular embodiment, the activation message is sent as an email. In step 726, the user selects the activation URL within the activation message. In step 728, the server 104 performs an access check on the URL to determine that the activation URL returned from the user is valid. In step 730, if access is not granted, the procedure 700 continues to step 732 in which the procedure 700 ends. If in step 730 access is granted, the user's membership in the network is activated in step 734, and the procedure continues to step 732 and ends. Accordingly, the user now has membership in the network and has access to the resources permitted by the user permissions.

Figure 8:
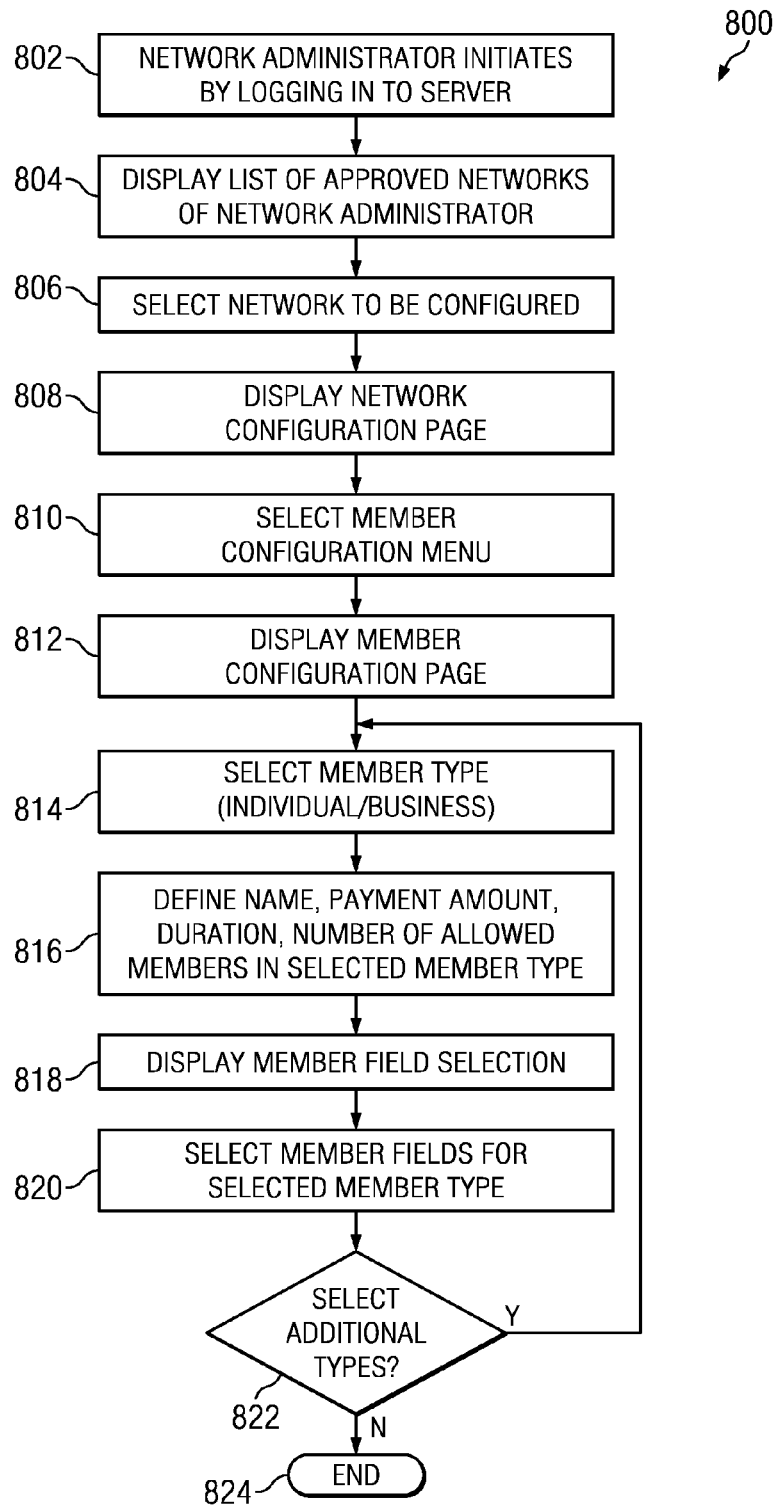
FIG. 8 illustrates an embodiment of a procedure for configuring a network by a network administrator.

FIG. 8 illustrates an embodiment of a procedure 800 for configuring a network by a network administrator. At step 802, the network administrator initiates configuration of a network by logging into the server 104. In step 804, a list of approved networks of the network administrator is displayed to the network administrator. In step 806, the administrator selects the network to be configured from the list of approved networks. In step 808, a network configuration page is displayed. In step 810, the network administrator selects a member configuration menu from the network configuration page. The member configuration menu is used to set the type of membership of members that will be allowed to join the network. In step 812, the member configuration page is displayed. In step 814, the network administrator selects a member type to be associated with the network. In the particular embodiment illustrated in FIG. 8, the member type may either be an individual member type or a business member type. An individual member type captures only the personal information from a member's profile for display to other members of the network. In some embodiments, individual member types may cause member profiles to be displayed in one or more personal directories on the particular network and or on other networks linked to the particular network. A business member type captures personal and business information, such as the name of the member's employer, from the member profile for display to the other members of the network. In addition, business member types may in some embodiments cause member profiles to be displayed in one or more business directories on the particular network or on other networks linked to the particular network. In step 816, the network administrator defines a name for the selected member type, a payment amount, and a number of allowed members in the selected member type. The payment amount indicates a cost for a member to subscribe to the particular network. The duration indicates the length of the member's membership. Based on the date of joining the network, each member's membership is defined with a start and end date. A reminder to renew the membership may be automatically generated and sent to the member's email at periodic intervals and/or at a predetermined number of days prior to expiration of the member's membership in the network. These parameters may be determined by the network administrator.

Upon membership expiration, the status of the member converts to that of a non-member. This means that the member no longer has access to any of the member-only resources of the network. In some embodiments, the non-member may be granted permission to continue to access some of the member-only resources. A non-member remains a registered user on the central network 102. In some embodiments, a non-member may be restricted to certain resources such as remaining on an email distribution list of the network or receiving text messages from the network. In addition, a particular user can have different roles and statuses in different networks. For example, a user could be an administrator of one network, a member of another network and a non-member of a third network. A non-member can then apply for or renew membership in a particular network. Resources offered by the network cease to be available to a non-member as well as all related groups of the network. In addition, linked networks that have a precondition of membership to the network to which the user is now a non-member are also unavailable.

In step 818, a member field selection page is displayed. The member field selection indicates the information fields of a member's profile are desired to be a captured by the particular network. In step 820, the network administrator selects the data field from the member's profile that will be used by the network. In addition, the network administrator may indicate particular fields which are mandatory to be filled out by a member of the network and indicate other fields in which filling out of the information is optional. In step 822, the network administrator may select whether he or she wishes to select additional member types to be added to the network. For example, the network administrator may configure multiple member types for each network in which each member type has different privileges. If in step 822 the network administrator indicates that he or she wishes to add additional member types, the procedure 800 returns to step 814. If the network administrator indicates in step 822 that no additional member types are desired, the procedure continues to step 824 at which the procedure 800 ends. After the network is configured by the network administrator, members may request to join the newly configured network.

Figure 9:
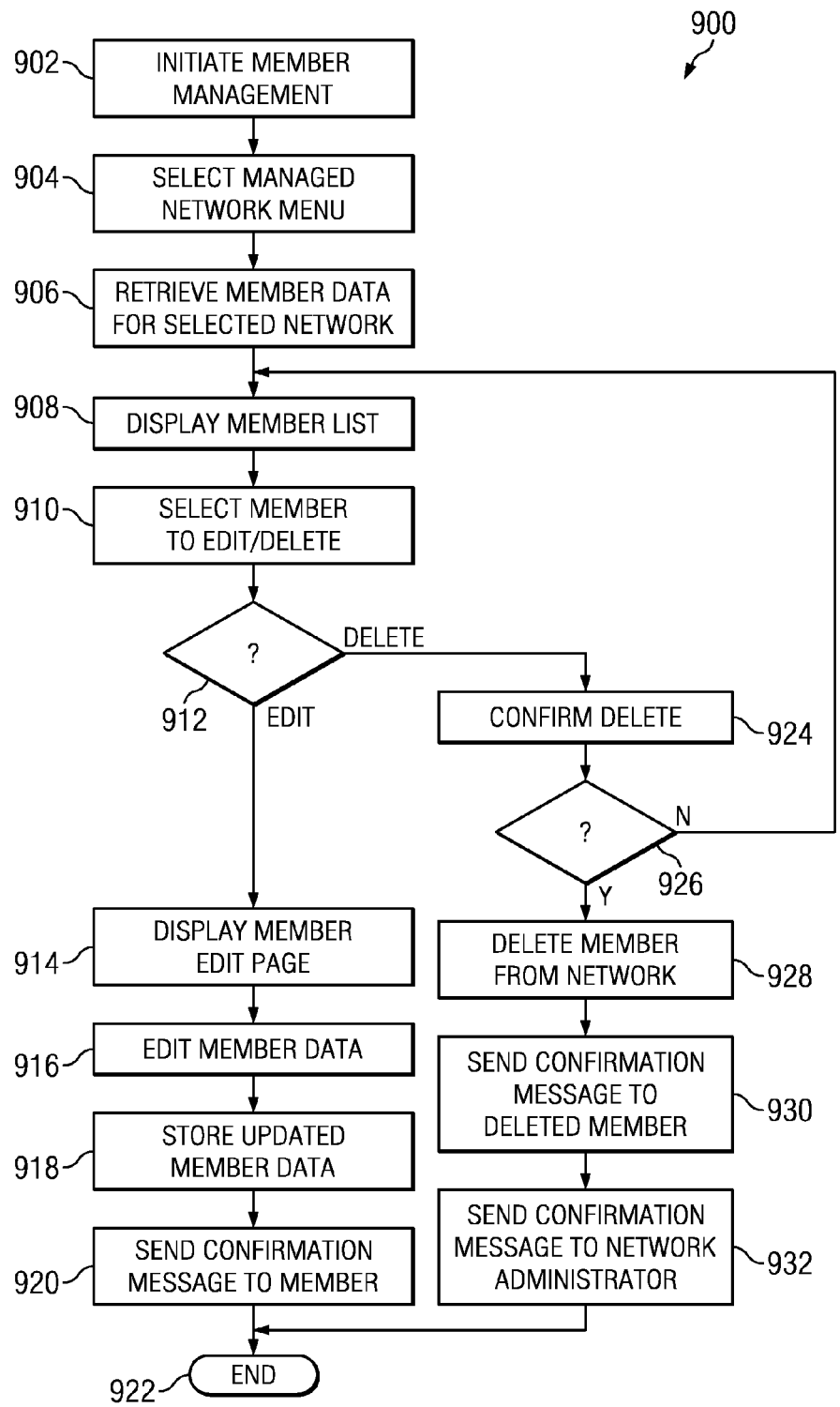
FIG. 9 illustrates an embodiment of a procedure for allowing a network administrator to manage members of a network.

FIG. 9 illustrates an embodiment of a procedure 900 for allowing a network administrator to manage members of a network. Through member management, the network administrator can edit member data or delete the member from a particular network. In step 902, the network administrator initiates member management by logging into the server 104. In step 904, the network administrator selects a manage network menu from a network administrator's homepage. In step 906, member data for a selected network is retrieved which includes a list of users who are members of the selected network. In step 908, the member list for the selected network is displayed. In step 910, the network administrator selects a member to edit or delete from the member list. In step 912, it is determined whether the network administrator selected an edit or delete option. If the network administrator selects to edit a member, the procedure 900 continues to step 914 in which a member edit page is displayed. In step 916, the network administrator may then edit the member data associated with the selected member. For example, the network administrator may change permissions for the member or edit personal data associated with the member. In step 918, the updated member data is stored, and in step 920 a confirmation message is sent to the edited member indicating that his member profile has been edited by the network administrator. In step 922, the procedure 900 ends.

If in step 912, the network administrator selected to delete a member, at step 924, a network administrator is prompted for confirmation. In step 926, it is determined whether the network administrator confirmed deletion. If the network administrator did not confirm deletion, the procedure returns to step 908. If the network administrator confirms deletion, the procedure continues to step 928 in which the member is deleted from the network. In step 930, a confirmation message is sent to the deleted member indicating that he or she has been deleted from the network by the network administrator. In step 932, a confirmation message is sent to the network administrator indicating that the deleted member has been deleted. In step 922, the procedure 900 ends.

Figure 10:
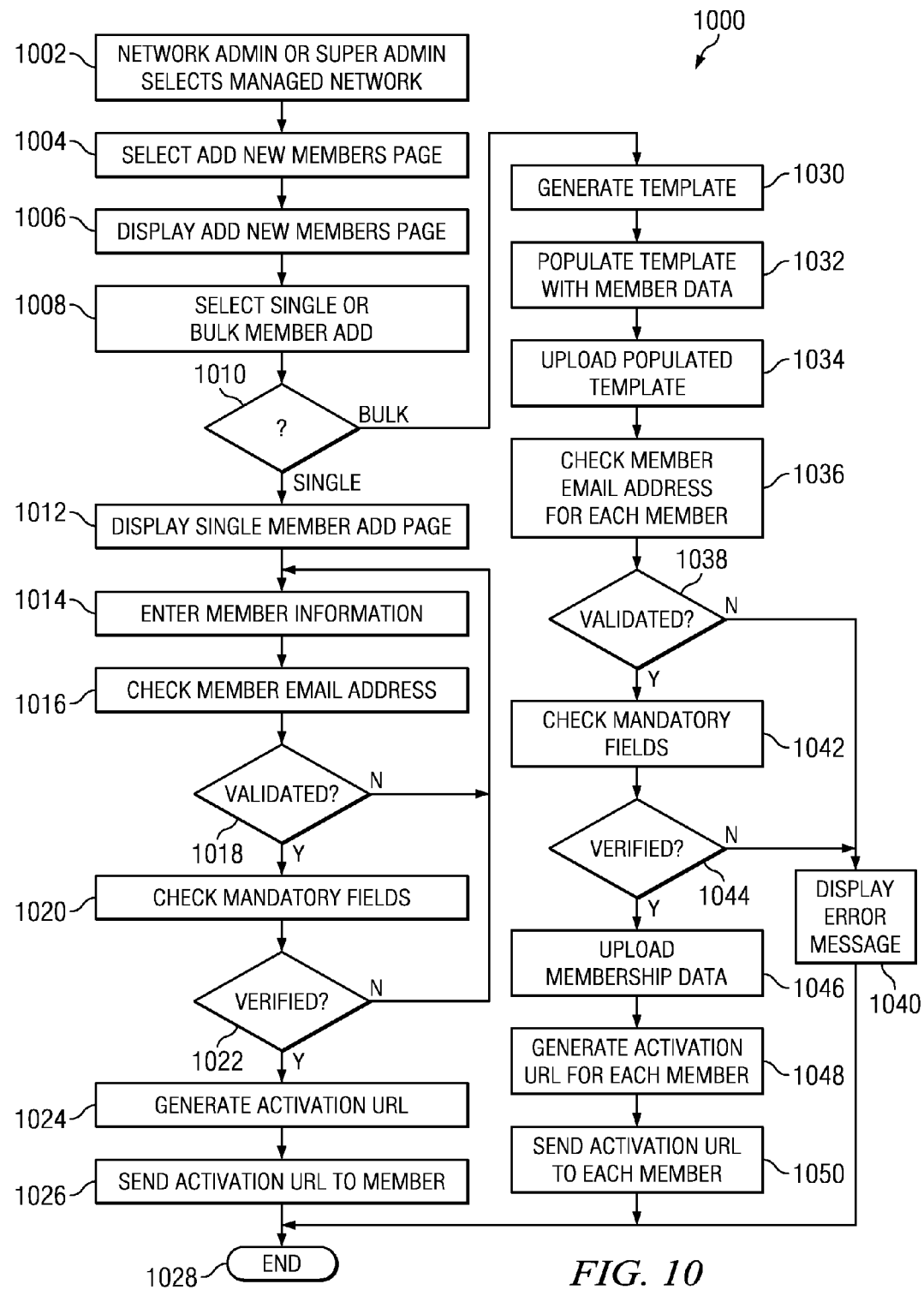
FIG. 10 illustrates an embodiment of a procedure for a network administrator or super administrator to add new members to a network.

FIG. 10 illustrates an embodiment of a procedure 1000 for a network administrator or super administrator to add new members to a network. In step 1002, a network administrator of a particular network or a super administrator of the central network 102 logs in to the server 104 and selects a managed network from a homepage. In step 1004, the network administrator or super administrator selects an add new members page from a menu. In step 1006, the add new members page is displayed. In step 1008, the network administrator or super administrator is prompted to select whether single member add or bulk member add is desired. With the single member add option, the network administrator may add one member at a time to the network. With the bulk member add option, the network administrator may add a number of members to the network at one time.

In step 1010, it is determined whether single or bulk member add was selected. If singe member add was selected, the procedure continues to step 1012 in which a single add member page is displayed. In step 1014, the network administrator or super administrator enters member information associated with the new member that is desired to be added. In step 1016, the new member's email address is checked for validity. In step 1018, it is determined whether the new member's email address has been validated. If the new member's email address has not been validated, the procedure returns to step 1014. If the new member's email address has been validated, the procedure continues to step 1020 in which mandatory fields of the member profile are checked for validity. In step 1022 it is determined whether the mandatory fields have been verified. If the mandatory fields have not been verified, the procedure returns to step 1014. If the mandatory fields have been verified, the procedure continues to step 1024. In step 1024, an activation URL is generated, and in step 1026, the activation URL is sent to the new member. In a particular embodiment, the activation URL is sent to the new member in an email message. The new member may subsequently activate the activation URL in order to confirm membership to the network. In step 1028, the procedure ends.

If it is determined in step 1010 that bulk member add is desired, the procedure continues to step 1030. In step 1030, a template for new members is generated. In a particular embodiment, the template may include a spreadsheet in which the network administrator fills out the information fields associated members to be added. In step 1032, the template is populated with member data associated with a plurality of new members by the network administrator. In step 1034, the populated template is uploaded to the server 104. In step 1036, the email address for each new member is checked for validity. In step 1038, it is determined whether the email addresses for each member has been validated. If one or more of the email addresses has not been validated, the procedure continues to step 1040. In step 1040, an error message is displayed indicating the one or more invalid email addresses and the procedure continues to step 1028 in which the procedure ends. The network administrator may then edit the incorrect email address information and try again. If the email addresses are validated, the procedure continues to step 1042 in which the mandatory fields are checked. In step 1044, it is determined whether the mandatory fields are verified. If the mandatory fields are not verified, the procedure continues to step 1040 in which an error message indicating which mandatory fields are not valid is generated and displayed, and the procedure ends at step 1028. The network administrator may then edit the incorrect data and try again. If the mandatory fields are verified, the procedure continues to step 1046 in which the membership data from the populated template is uploaded to the server 104. In step 1048, an activation URL is generated for each new member, and in step 1050, the activation URL is sent to each new member. In step 1028, the procedure ends. When each new member activates the activation URL, the new member will be added to the network.

Figure 11:
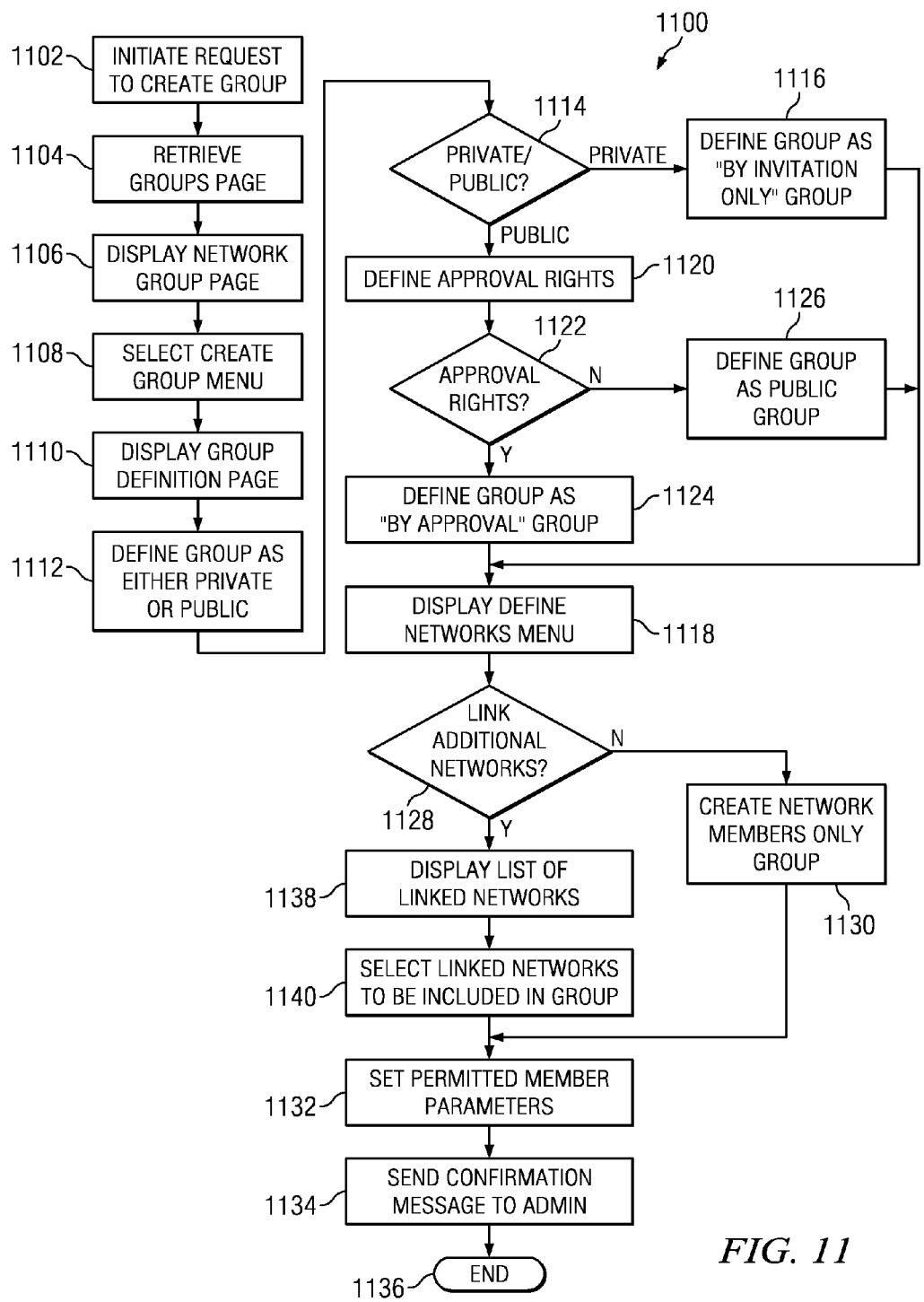
FIG. 11 illustrates an embodiment of a procedure for creation of a group associated with one or more networks.

FIG. 11 illustrates an embodiment of a procedure 1100 for creation of a group associated with one or more networks. A group allows one or more members in the same network or in linked networks to be joined together for a common purpose, interact with one another, and share resources with one another. In step 1102, a network administrator or other user that has permission to create groups within a particular network initiates a request to create a group. In a particular embodiment, the initiation of the request to create the group may include the network administrator or other user logging in to the server 104. In step 1104, a group's page associated with a selected network is retrieved from the server 104. In step 1106, the network group page is displayed. In step 1108, the network administrator or authorized user selects a create group menu. In step 1110, a group definition page is displayed. In step 1112, the network administrator or authorized user defines the new group as either a private or public group. A private group is restricted to certain members of the central network 102. A public group allows any member of the central network 102 to send a request to join the group. In step 1114, it is determined whether the network administrator or user selected a private or public group. If the network administrator or user selects a private group, the procedure continues to step 1116 in which the new group is defined as a "by invitation only." The by invitation only group may be joined only by members that have been invited to join the group by the network administrator or authorized user. The procedure then continues to step 1118. If it is determined in step 1114 that the group has been designated as a public group, the procedure continues to step 1120 in which the network administrator or authorized user is prompted to define whether approval rights are required for the public group. By selecting approval rights, any member of the network may request joining the group. However, the by approval group requires approval of the network administrator or authorized user before the member is allowed to join. In step 1122, it is determined whether the network administrator or authorized user selected approval rights. If approval rights are selected, the procedure continues to step 1124 in which the new group is defined as a "by approval" group. The procedure then continues to step 1118. If in step 1122, the network administrator or authorized user determines that no approval rights are required, the new group is defined as a public group in step 1126. A public group allows any member of the network to become a part of the group. The procedure 1100 then continues to step 1118.

In step 1118, a define networks menu is displayed to the network administrator or user. The define networks menu allows the network administrator or user to determine whether he or she wishes to link additional linked networks to the new group. This allows the network administrator to grant permission of certain members of another linked network to join the group. In step 1128, it is determined whether the linking of additional linked networks to the group are desired. If additional networks are not desired to be linked to the new group, the procedure continues to step 1130. In step 1130, the group is created as a network members only group and the procedure continues to step 1132. In step 1132, the network administrator or user may set permitted member parameters associated with the new group. The permitted member parameters indicate required characteristics of a member before they are allowed to join the group. For example, the network administrator or authorized user may determine that only members who are CEOs of their respective organizations may join the new group. In step 1134, a confirmation message indicating creation of a new group is sent to the network administrator, and in step 1136, the procedure 1100 ends. If it is determined that in step 1128 that the linking of additional networks is desired, the procedure continues to step 1138. In step 1138, a list of linked networks is displayed. These linked networks are networks that have been linked to the present network. In step 1140, the network administrator or authorized user may select which of the linked networks are to be included in the new group. The procedure then continues to step 1132 in which permitted member parameters are set, step 1134 in which a confirmation message is sent to the administrator, and the procedure ends at step 1136.

Figure 12:
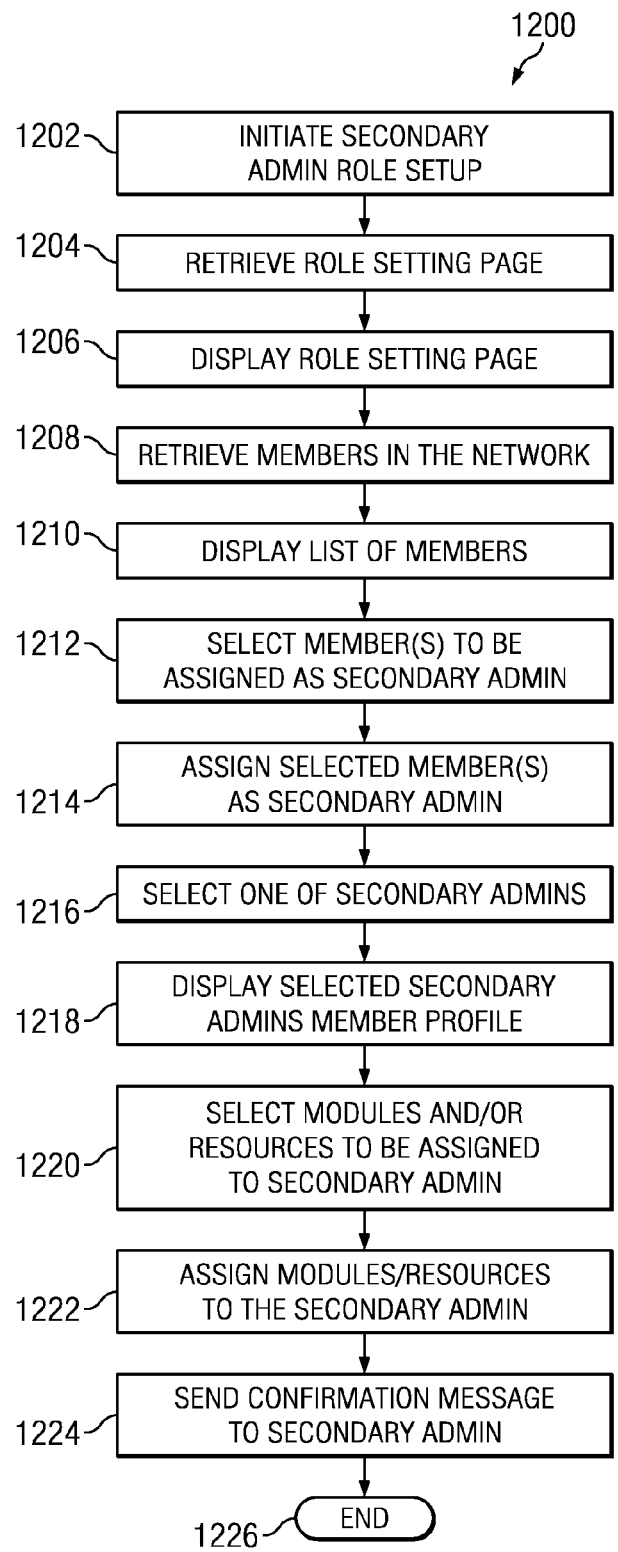
FIG. 12 illustrates an embodiment of a procedure for designating a secondary administrator of a network by an administrator of a network.

FIG. 12 illustrates an embodiment of a procedure 1200 for designating a secondary administrator of a network by an administrator of a network. By designating a secondary administrator, the network administrator may give designated network management capabilities to another member of the network. In step 1202, a network administrator initiates a secondary administrator role setup by logging in to the server 104. In step 1204, a role setting page is retrieved from the server 104. In step 1206, the role setting page is displayed to the network administrator. In step 1208, the members of a selected network are retrieved, and in step 1210, the list of members of the selected network is displayed. In step 1212, the network administrator selects one or more members to be assigned as a secondary administrator of the selected network. In step 1214, the selected members are assigned as secondary administrators. In step 1216, the network administrator selects one of the secondary administrators' profiles, and in step 1218, the selected secondary administrator's member profile is displayed. In step 1220, the network administrator selects modules and/or resources to be assigned to the secondary administrator. The assigned modules/resources are those modules or resources to which the secondary administrator is to be granted access and administration rights. In step 1222, the assigned modules/resources are assigned to the secondary administrator, and in step 1224, a confirmation message is sent to the secondary administrator indicating the member's assignment as the secondary administrator. In step 1226, the procedure 1200 ends.

Figure 13:
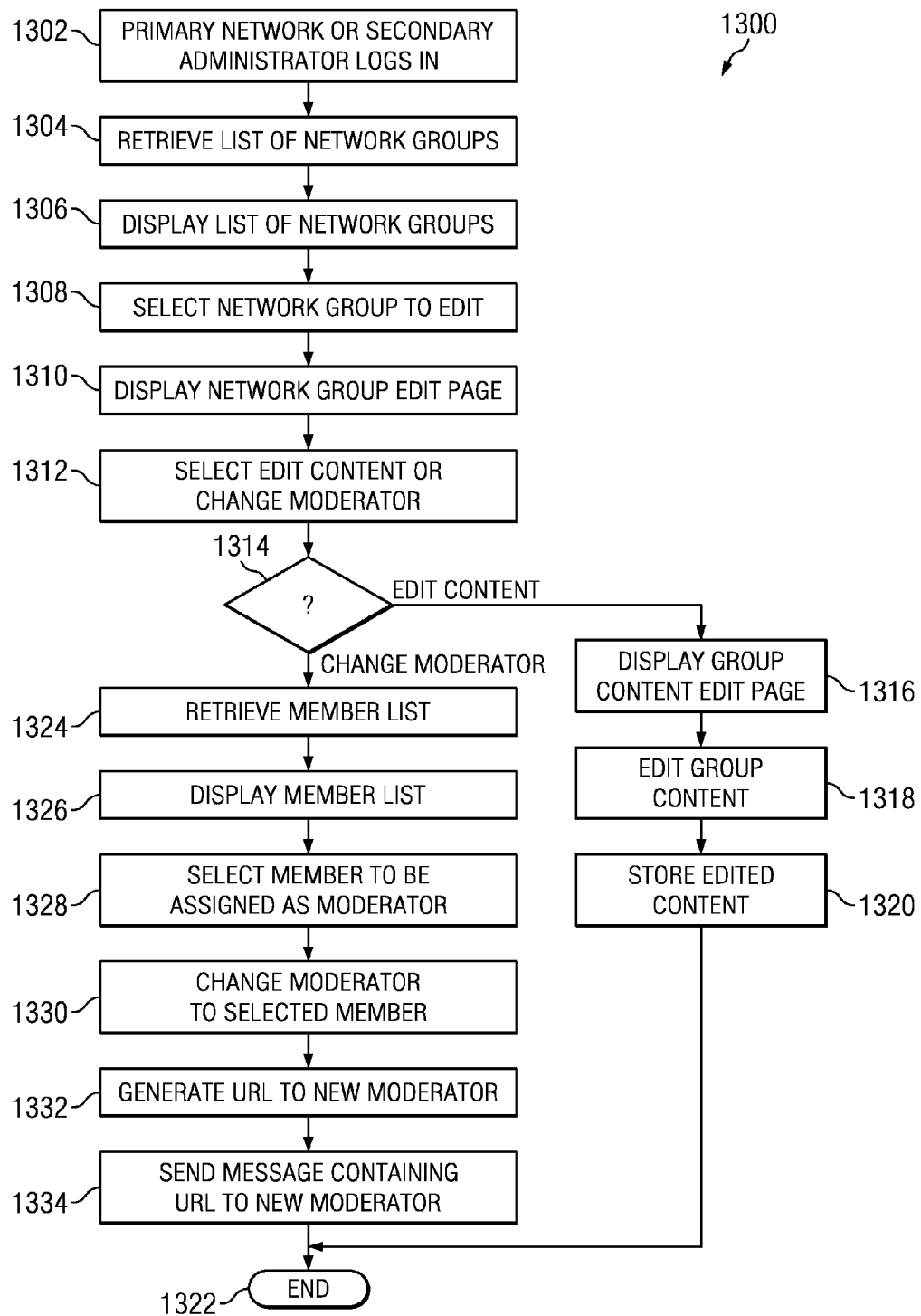
FIG. 13 illustrates an embodiment of a procedure for managing of a network group.

FIG. 13 illustrates an embodiment of a procedure 1300 for managing of a network group. Management of a network group allows a primary network administrator or a secondary administrator to edit content available to group members and assign group members as moderators of the group. In step 1302, the primary network administrator or secondary administrator logs into the server 104. In step 1304, a list of groups within the network is retrieved from the server 104. In step 1306, the list of networks groups within the network is displayed. In step 1308, the primary network or secondary administrator selects a network group to edit. In step 1310, a network group edit page is selected. In step 1312, an option is presented to either edit content of the group or change a moderator of the group. In step 1314, it is determined whether the primary network or secondary administrator chose to edit content or change the moderator. If the edit content option is chosen, the procedure continues to step 1316 in which a group content edit page is displayed. In step 1318, the primary network administrator or secondary administrator edits group content. Editing of group content may include adding or deleting of resources such as event schedules, blogs, forums, foreign topics, announcements, newsletters and other resources associated with the group. In step 1320, the editing content is stored, and in step 1322, procedure 1300 ends. If in step 1314, the change moderator option has been selected, the procedure continues to step 1324 in which a member list of the group is retrieved. A group moderator has the capability to edit selected content of the group such as editing or deleting forum posts or adding new content to the group. In step 1326, a member list is displayed. In step 1328, a member from the member list is selected by the primary network administrator or secondary administrator to be assigned as the moderator of the group. In step 1330, the selected member is changed to or assigned as the moderator of the group. In step 1332, a URL is generated to the new moderator, and in step 1334, a message containing the URL is sent to the new moderator. The new moderator may later click on the URL to confirm that they wish to be added as the moderator. In step 1322, the procedure 1300 ends.

Figure 14:
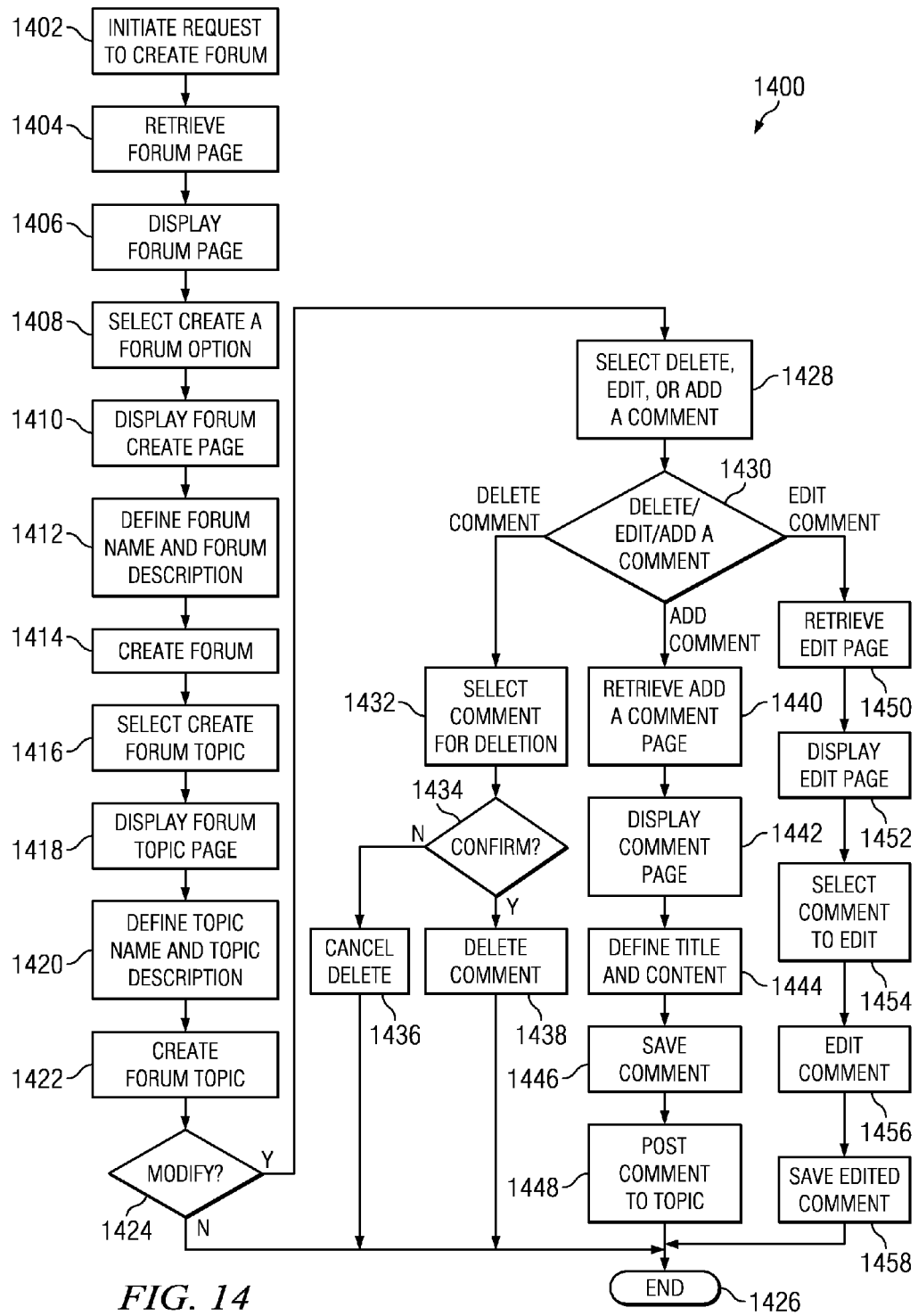
FIG. 14 illustrates the embodiment of a procedure for creating a forum for member discussion within a network or group.

FIG. 14 illustrates the embodiment of a procedure 1400 for creating a forum for member discussion within a network or group. A forum allows members of a network or a group to discuss various topics of conversation among each other. In step 1402, a network administrator or secondary administrator initiates a request to create a forum by logging in to the server 104 and selecting a forum menu. In step 1404, a forum page is retrieved from the server 104, and in step 1406, the forum page is displayed. In step 1408, the administrator selects forum creation option, and in step 1410, a forum create page is displayed. In step 1412, the administrator defines a forum name and forum description indicating the subject matter to which discussion in the forum is to be directed. In step 1414, the forum is created. In step 1416, the network administrator or secondary administrator selects an option to create a forum topic within the forum. A forum topic is a discussion area within a forum which is addressed to a particular issue. Each forum may have a number of forum topics contained within it. In step 1418, a forum topic page is displayed. In step 1420, the network administrator or secondary administrator defines a topic name and topic description for the forum topic, and in step 1422, the forum topic is created. In step 1424, the network administrator or secondary administrator may be prompted to indicate whether he or she wishes to modify the created forum topic. If the network administrator or secondary administrator does not wish to modify the created forum topic, the procedure continues to step 1426 in which the procedure ends. If the network administrator or secondary administrator indicates that he or she wishes to modify the created forum topic, the procedure continues to step 1428 in which the network administrator or secondary administrator is prompted to select either to delete a comment in the forum topic, edit a comment in the forum topic or add a comment to the forum topic. In step 1430, it is determined whether the network administrator or secondary administrator selected delete, edit or add a comment. If deletion of a comment was selected, the procedure continues to step 1432 in which the comment for deletion is selected by the network administrator or the secondary administrator. In step 1434, the network administrator or secondary administrator is prompted to confirm deletion. If deletion is not confirmed in step 1434, the delete is canceled and the procedure continues to step 1426 and ends. If deletion is confirmed in step 1434, the selected comment is deleted from the forum topic in step 1438, and the procedure continues to step 1426 and ends.

If addition of a comment was selected in step 1430, the procedure continues to step 1440 in which an add a comment page is retrieved. In step 1442, the comment page is displayed. In step 1444, the network administrator or secondary administrator may define a title and content of a new comment, and in step 1446, the comment is saved. In step 1448, the comment is posted to the forum topic and the procedure continues to step 1426 and ends.

If in step 1430 edit comment was selected, the procedure continues to step 1450 in which an edit comment page is retrieved. In step 1452, the edit page is displayed. In step 1454, the comment to be edited is selected. For example, the network administrator or secondary administrator may wish to edit a comment to remove objectionable content. In step 1456, the comment is edited by the network administrator or secondary administrator. In step 1458, the edited comment is saved to the forum topic. The procedure then continues to step 1426 and ends. In other embodiments, other types of resources, such as announcements or blogs, may be created in a similar manner, and different permissions could be set for each of the resources.

Figure 15:
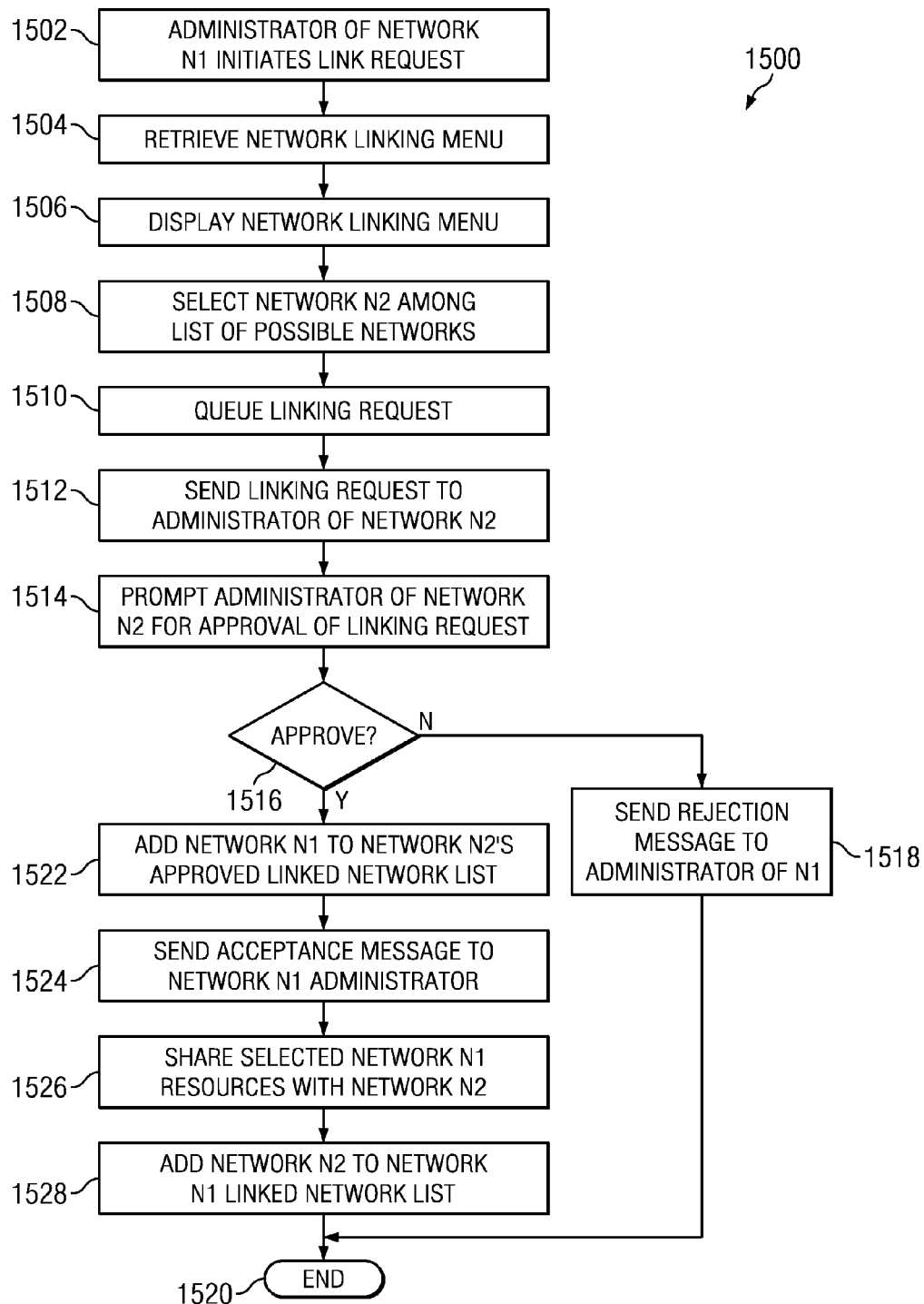
FIG. 15 illustrates an embodiment of a procedure for linking a first network to a second network.

FIG. 15 illustrates an embodiment of a procedure 1500 for linking a first network to a second network. The linking of the first network to the second network allows selected resources of the first network to be shared with selected members of the second network. In step 1502, an administrator of network N1 initiates a link request by logging into the server 104 and selecting a network linking option. In step 1504, a network linking menu is retrieved from the server 104. In step 1506, the network linking menu is displayed to the administrator of network N1. In step 1508, the administrator of network N1 selects network N2 among a list of possible networks for linking. In step 1510, a linking request to link to network N2 is generated and queued. In step 1512, the linking request is sent to the administrator of network N2. In step 1514, the administrator of network N2 is prompted for approval of the linking request. In step 1516, it is determined whether the network administrator of network N2 approved the linking request from network N1. If the request is not approved, the procedure continues to step 1518 in which a rejection message is sent to the administrator of network N1, and the procedure ends in step 1520. If the administrator of network N2 approves the linking request, the procedure continues to step 1522. In step 1522, network N1 is added to network N2's approved linked network list. In step 1524, an acceptance message is sent to the administrator of network N1 indicating that the linking request has been selected. In step 1526, selected network N1 resources as determined by the administrator of network N1 are shared with members of network N2. In step 1528, network N2 is added to network N1's linked network list. In step 1520, the procedure ends. In various embodiments, the administrator of network N2 may designate the members of network N2 that will have access to the resources of network N1. In addition, in various embodiments the administrator of network N2 may designate which of the offered resources of network N1 will be available to members of network N2. If network N2 wishes to share selected resources with members of network N1, the administrator of network N2 will initiate a link request in a similar manner. In still other embodiments, upon approval of a network request from network N1 to network N2, selected resources in network N2 may be set to automatically be shared with members of network N1. In other embodiments, the resources need not be selected at the time of linking of network N1 and network N2. Instead, the selection of resources for sharing may be performed at a different time.

Figure 16:
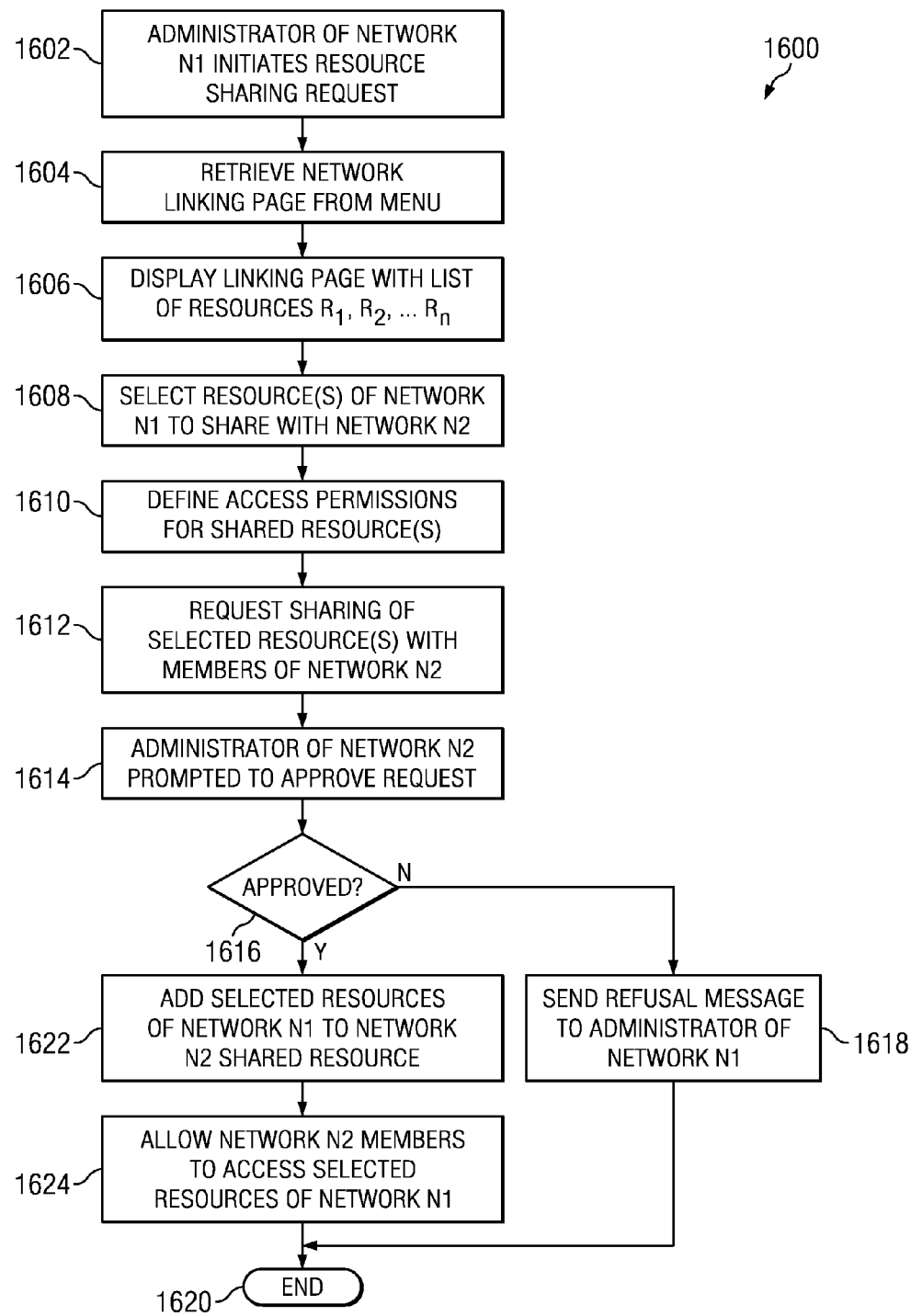
FIG. 16 illustrates an embodiment of a procedure for resource sharing between linked networks.

FIG. 16 illustrates an embodiment of a procedure 1600 for resource sharing between linked networks. Sharing of resources between linked networks allows members of each linked network to collaborate or share information about a common interest or goal. In step 1602, an administrator of network N1 initiates a resource sharing request by logging into the server 104 and selecting a network linking option from a menu. In step 1604, a network leading page is retrieved from the menu, and in step 1606, the linking page with a list of available resources R1-Rn is displayed. In step 1608, the administrator of network N1 selects one or more resources R1-Rn of network N1 to share with network N2. In step 1610, the administrator of network N1 defines access permissions for the shared resources. The access permissions may include the types of members of network N2 that will be allowed to access the various resources. In other embodiments, the administrator may deny access permission to a particular member, or a member having particular characteristics, regardless of the network to which he or she belongs, even if the member is allowed access by another network of which he or she is a member. In still other embodiments, a particular resource may be designated as being publicly shared with any member of a network within the central network 102.

At step 1612, a request message for sharing the selected resources with members of network N2 is sent to the administrator of network N2. In step 1614, the administrator of network N2 is prompted to approve the request for the sharing of resources with network N1. In step 1616, it is determined whether the administrator of network of N2 approved the request. If it is determined in step 1616 that the network administrator of network N2 did not approve their request, the procedure continues to step 1618 in which a refusal message is sent to the administrator of network N1 indicating that the request for shared resources has been denied. In step 1620, the procedure ends. If in step 1616 it is determined that the administrator of network N2 approved the shared resource request, the procedure continues to step 1622 in which the selected resources of network N1 are added to network N2's shared resources. In step 1624, network N2 members are allowed to access the selected resources of network N1, and in step 1620, the procedure 1600 ends. In some embodiments, the sharing of the resources of network N1 with members of network N2 may include only viewing or accessing the shared resources by members of network N2. In still other embodiments, the sharing of resources of network N1 with members of network N2 may include the ability to edit or modify as well as access the shared resources of network N1. In various embodiments, an administrator can remove access to a particular resource from members of network N2 without revoking the link between network N1 and network N2.

Figure 17:
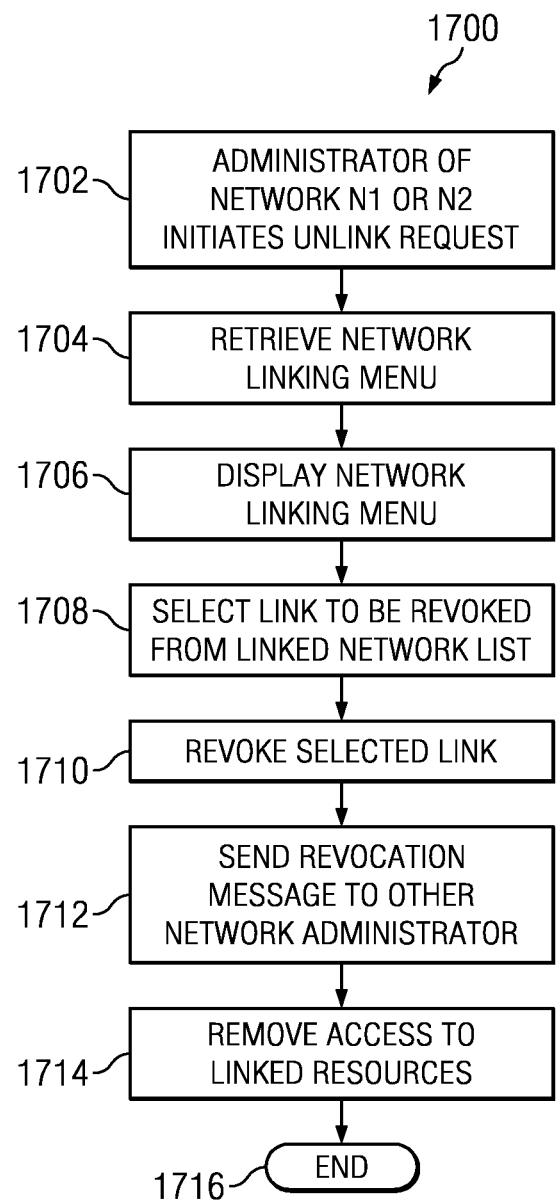
FIG. 17 illustrates an embodiment of a procedure for revocation of a linked network.

FIG. 17 illustrates an embodiment of a procedure 1700 for revocation of a linked network. An administrator of a particular network may wish to revoke a link with another network in a situation in which collaboration between the networks is no longer desired by the administrator. In the embodiment illustrated in FIG. 17, network N1 is linked to network N2, and network N1 shares selected resources with members of network N2. In step 1702, an administrator of either network N1 or network N2 initiates an unlink request by logging in to the server 104 and selecting a network linking menu. In step 1704, the network linking menu is retrieved from the server 104, and in step 1706 the network linking menu is displayed. The network linking menu shows a list of other networks to which the network is currently linked. In step 1708, the administrator selects the link to be revoked from the linked network list. In step 1710, the selected link between network N1 and N2 is revoked. In step 1712, a revocation message is sent to the other network administrator, that is the administrator that did not initiate the un-linking procedure. In step 1714, access to linked resources provided by network N1 are removed from access by members of network N2. In step 1716, the procedure 1700 ends. Upon revocation of the link between network N1 and network N2, the members of network N2 no longer have access to the shared resources of network N1.

One or more advantages of at least one embodiment of the present invention may include, but are not limited to, gaining of synergy as a result of members of a network being linked to other networks at the organizational level controlled by settings for the sharing of information, privileges, processes, databases, etc.; conduct business; communicate with each other for social, economic, religious, medical benefit, and/or based on a common interest, purpose, need, race, color, religion, age, gender, disability, military status, sex, pregnancy, language, nation of origin or any other reason.

It will be appreciated by those skilled in the art having the benefit of this disclosure that various embodiments provide a system and method for linking together of two or more individual networks, and facilitating the sharing of resources associated with the individual networks with members of other linked networks. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of linking a first network to a second and disparate network comprising:

each of the first and second networks defined by a unique Universal Resource Locator (URL) and each having resources uniquely associated therewith and each administered by a network centric administrator and able to each have a plurality of members uniquely associated therewith with defined network access rights to the respective network and each of the first and second networks able to create a network-to-network link to the other;

the network centric administrator for the first network sending, by the first network having at least one first member associated therewith, a link request message to the second network having at least one second member associated therewith, the link request message including a request to establish a network-to-network link with the second network, the first network further including at least one of the resources associated therewith accessible by the at least one first member;

the network centric administrator for the second network generating an acceptance message and the network centric administrator for the first network receiving the acceptance message from the second network at the first network;

establishing a first network-to-network link between the first network and the second network in response to receiving the acceptance message; and sharing access to the at least one resource on the second network to the at least one first member of the first network over the network-to-network link, such that the at least second member of the second network can access the at least one resource on the first network, but no access being granted to the at least one second member on the second network to any resources on the first network by way of the acceptance message generated by the network centric administrator for the second network.

2. The method of claim 1, further comprising:

selecting by the network centric administrator for the first network the at least one resource associated with the first network;

sending a request for sharing of the at least one resource to the second network; and approving by the network centric administrator for the first network sharing of the at least one resource to the at least one second member by the second network.

3. The method of claim 1, further comprising:

revoking by the network centric administrator for the first network of the at least one link between the first network and the second network; and removing access to the at least one resource to the at least one second member.

4. The method of claim 1, further comprising:

forming a first group; and adding one or more of the at least one first member and the at least one second member into the first group.

5. The method of claim 4, further comprising:

sharing by the network centric administrator for the first network access to the at least one resource to the members of the first group.

6. The method of claim 1, wherein the sending of the link request message to the second network is initiated by the network centric administrator for the first network which consists of the group of an administrator, super administrator, or the at least one first member of the first network.

7. The method of claim 1, further comprising:

defining by the network centric administrator for the first network an access permission for the at least one resource, wherein the sharing of access to the at least one resource is based upon the access permission.

8. The method of claim 1, further comprising:

denying by the respective one of the network centric administrator for the first or second network access to a particular member of the at least one resource regardless of a network membership of the particular member.

9. The method of claim 1, further comprising:
establishing by the network centric administrator for the second network a second link between the second network and the first network.

10. The method of claim 9, further comprising:
sharing by the network centric administrator for the second network access to at least one resource associated with the second network to the at least one first member of the first network.

11. A system for linking a first network to a second network comprising:
a first network;
a second network; and
a server;
wherein each of the first and second networks defined by a unique Universal Resource Locator (URL) and each having resources uniquely associated therewith and each administered by a network centric administrator and able to each have a plurality of members uniquely associated therewith with defined network access rights for the respective network and each of the first and second networks able to create a network-to-network link to the other;
the first network having at least one first member uniquely associated therewith, the first network further including at least one shared resource uniquely associated therewith and accessible by the at least one first member;
the second network having at least one second member uniquely associated therewith; and
the server in communication with the first network and the second network,
receive from the network centric administrator for the first network a link request message, the link request message including a request to establish a link between the first network and the second network;
send the link request message to the network centric administrator for the second network;
receive from the network centric administrator for the second network an acceptance message from the second network;
send the acceptance message to the network centric administrator for the first network;
establish a first network-to-network link between the first network and the second network by the network centric administrator for the first network in response to receiving the acceptance message from the server; and
share access to the at least one resource on the first network to the at least one second member of the second network, but no access being granted to the at least one second member on the second network to any resources on the first network by way of the acceptance message generated by the network centric administrator for the second network.

12. The system of claim 11, wherein the server is further configured to:
receive from the network centric administrator for the first network a selection of the at least one resource associated with the first network;
send a request for sharing of the at least one resource to the network centric administrator for the second network; and
receive approval of sharing of the at least one resource to the at least one second member by the second network from the network centric administrator for the first network.

13. The system of claim 11, wherein the server is further configured to:
revoke the at least one link between the first network and the second network; and remove access to the at least one resource to the at least one second member.

14. The system of claim 11, wherein the server is further configured to:
form a first group; and
add one or more of the at least one first member and the at least one second member into the first group.

15. The system of claim 14, wherein the server is further configured to:
share access to the at least one resource to the members of the first group.

16. The system of claim 11, wherein the sending of the link request message to the network centric administrator for the second network is initiated the network centric administrator for the first network consisting of the group of an administrator, super administrator, or member of the first network.

17. The system of claim 11, wherein the server is further configured to:
receive a definition of an access permission for the at least one resource, wherein the sharing of access to the at least one resource is based upon the access permission.

18. The system of claim 11, wherein the server is further configured to:
deny access to a particular member of the at least one resource regardless of a network membership of the particular member.

19. The system of claim 11, wherein the server is further configured to:
establish a second link between the second network and the first network.

20. The system of claim 19, wherein the server is further configured to:
share access to at least one resource associated with the second network to the at least one first member of the first network.

* * * * *